United States Patent [19]

Malicki

[11] Patent Number: 4,553,124
[45] Date of Patent: Nov. 12, 1985

[54] STRAIN GAUGE TRANSDUCER ASSEMBLY

[75] Inventor: Raymond W. Malicki, Dearborn Heights, Mich.

[73] Assignee: Carron & Company, Inkster, Mich.

[21] Appl. No.: 733,396

[22] Filed: May 10, 1985

Related U.S. Application Data

[63] Continuation of Ser. No. 532,666, Sep. 16, 1983, abandoned.

[51] Int. Cl.[4] .................................................. G01L 1/22
[52] U.S. Cl. ............................................ 338/5; 338/2;
73/862.65; 73/761; 73/768
[58] Field of Search ..................... 338/2, 5, 6; 73/761, 73/768, 862.62, 862.64, 862.65, 862.66

[56] References Cited

U.S. PATENT DOCUMENTS

| | | | |
|---|---|---|---|
| 2,925,576 | 2/1960 | Wakeland et al. | 338/229 |
| 3,201,977 | 8/1965 | Kutsay | 73/862.65 X |
| 4,203,318 | 5/1980 | Yorgiadis | 338/5 |
| 4,280,363 | 7/1981 | Johansson | 338/5 X |
| 4,429,579 | 2/1984 | Wilhem | 73/862.65 X |

Primary Examiner—C. L. Albritton
Assistant Examiner—M. M. Lateef
Attorney, Agent, or Firm—Brooks & Kushman

[57] ABSTRACT

A strain gauge transducer (10) disclosed has particular utility when utilized with a bolt (12) to sense loading and has a construction which permits accurate axial alignment, testing before installation, removal for inspection and any necessary repair, and accurate readings that are not substantially affected by bending loading. The transducer (10) includes a body (30) having a web (40) extending between a threaded inner end (32) and an enlarged outer head (34). An annular seat (36) on the head (34) engages a bolt hole surface as the threaded inner end (32) is received by a threaded portion of the bolt hole. At least two strain gauges (46) are utilized with each mounted on one of the parallel web surfaces (42), and wires (50) connected to the strain gauges extend through a wire passage (48) in the enlarged head to permit a signal to be sensed by the strain gauges and fed to suitable instrumentation. In the preferred construction, the web (40) has a thickness in the range of about 0.020 to 0.060 of an inch and most preferably, about 0.040 of an inch in order to minimize twisting of the web upon installation while still providing accurate readings that are not substantially affected by bending loading. Round inner and outer portions (52,54) provide uniform loading of the web (4) without any stress concentrations.

11 Claims, 8 Drawing Figures

U.S. Patent Nov. 12, 1985 Sheet 1 of 2 4,553,124
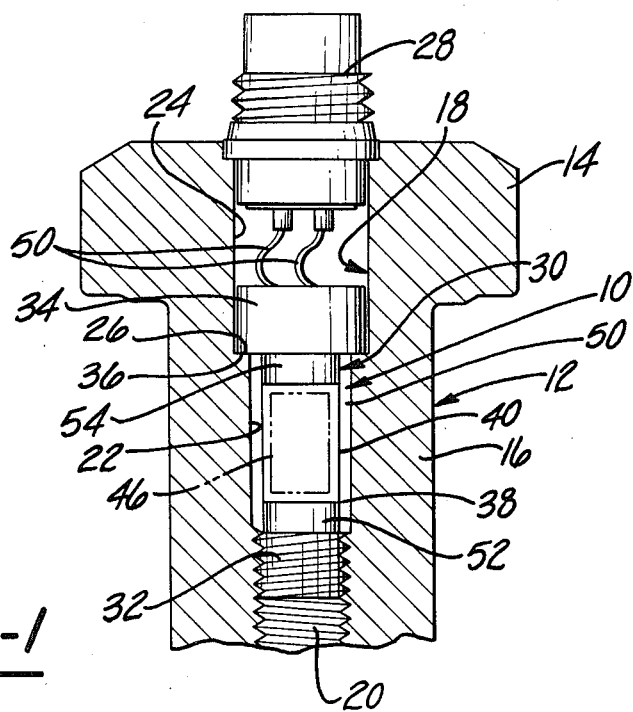
_Fig-1_
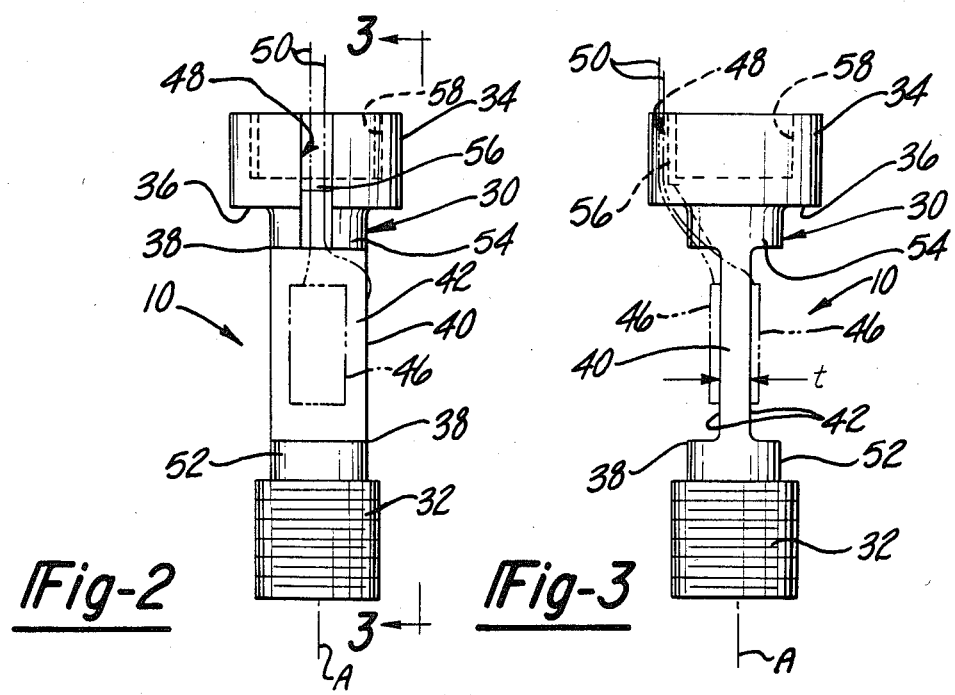
_Fig-2_  _Fig-3_

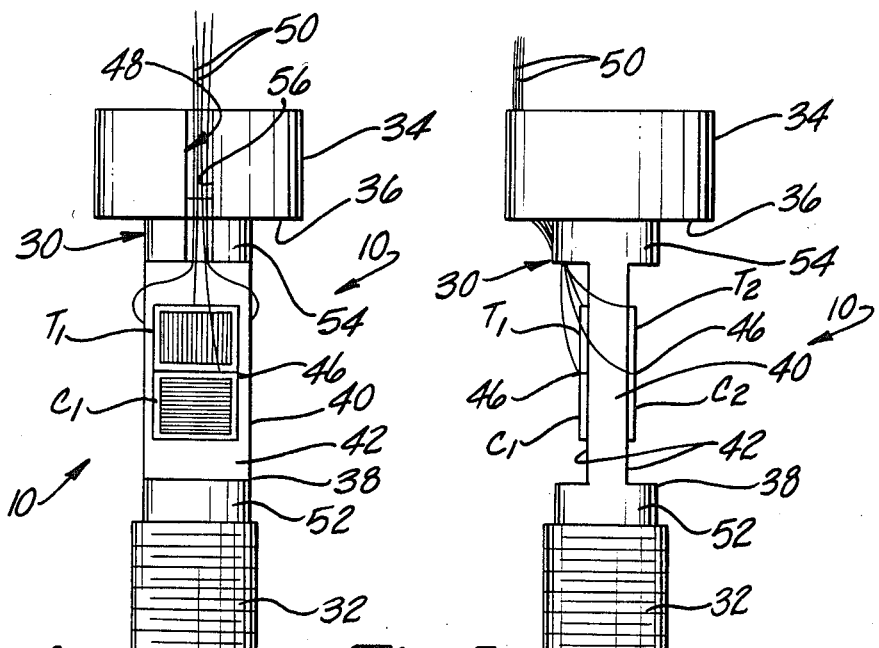
*Fig-4*   *Fig-5*
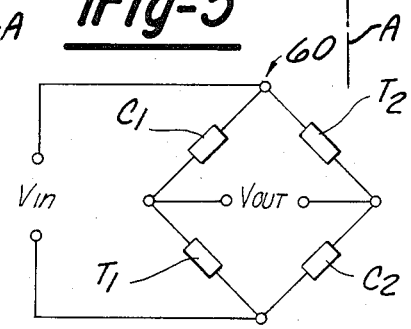
*Fig-6*
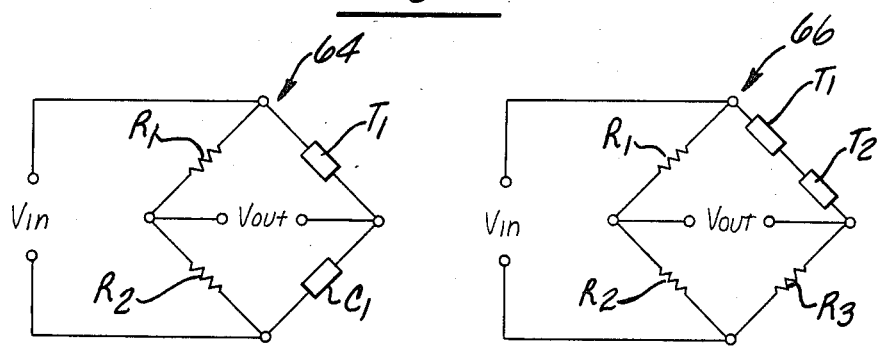
*Fig-7*   *Fig-8*

STRAIN GAUGE TRANSDUCER ASSEMBLY

This application is a continuation of application Ser. No. 532,666, filed Sept. 16, 1983, now abandoned.

TECHNICAL FIELD

This invention relates to a strain gauge transducer for sensing loading.

BACKGROUND ART

Strain gauge transducers are conventionally utilized to sense loading such as is necessary in testing to make sure the components tested can withstand the stress involved during normal use and extraordinary loading. Usually such transducers are utilized to test the stress at joints and comprise bolts that hold the joints together. These bolt transducers are provided with strain gauges to sense the stress to which the joints are subjected. Certain strain gauge bolt transducers are provided with a portion having a square cross section on which strain gauges are mounted externally on each of the four sides to sense loading. Other strain gauge bolt transducers include a central hole of a round cross section defined by a round surface on which strain gauges are mounted internally to sense the loading. With the external type of bolt transducer, it is not possible to check the strain gauges without removing the bolts and thus breaking the joint connected by the bolt. With the internal type of bolt transducer, no checking of the strain gauges is ever possible due to the mounting thereof within the interior of the bolt hole. Furthermore, the strain gauges of both the external and internal type of bolt transducers are spaced relatively far from the central neutral axis of bending such that large error can be introduced in the load sensed during bending due to small gauge misalignment.

The United States patent of Wakeland et al 2,925,576 discloses a strain-sensitive electrical pick-up device which includes a columnar element having a threaded inner end that is received by a threaded hole and also having a flange that is seated about the hole. An intermediate portion of the element has a round shape and is wound by a strain wire to sense loading. This strain wire is located remote from the central axis of the element and is, therefore, subjected to reading bending error as the element is loaded.

The United States patent of Reichow et al 4,042,049 discloses load transducers including curved bending beams having curved faces on which associated pairs of strain gauges are mounted to sense loading. At opposite ends of the beams, mounts are provided to support the beams in position for sensing a load on a member being tested.

The U.S. Pat. No. 4,200,855 of Gilcher discloses a bolt-like railway vehicle wheel detector. This detector includes a strain gauge sensor having an intermediate surface on which a strain gauge is mounted to sense loading as a wheel of a rail car passes over a rail on which the sensor is mounted.

Other strain gauge transducers and load sensing devices are disclosed by the following U.S. Pat. Nos.: 2,393,714; 2,600,029; 2,747,454; 2,873,341; 3,132,319; 3,212,325; 3,905,356; and 4,127,788.

DISCLOSURE OF INVENTION

An object of the present invention is to provide an improved strain gauge transducer. In carrying out this object, the transducer of the invention provides the capability of accurate axial gauge alignment, testing before installation, removal after installation for inspection and repair if necessary, and readings that are not substantially affected by bending loads.

The strain gauge transducer of the invention comprises a transducer body having a central axis and including a threaded inner end and an outer end having an enlarged head. An annular seat of the enlarged head faces toward the inner end of the tranducer body and is seated upon threading of the inner end into a threaded hole. An intermediate portion of the transducer body includes a web that connects the inner and outer ends thereof and has oppositely facing parallel surfaces. The web has a width that is a plurality of times the thickness thereof and less than the diameter of the threaded inner end. At least two strain gauges are utilized, each of which is mounted on one of the web surfaces to sense deformation of the web as the transducer is loaded. A wire passage extends through one end of the transducer body, and wires are connected to the strain gauges and extend through the wire passage to permit sensing of the deformation of the web sensed by the strain gauges.

The strain gauge transducer has particular utility when utilized with a bolt to sense loading of the bolt. However, the strain gauge transducer can be also utilized to sense loading of other members that may be required for whatever purpose. Regardless of the manner in which the transducer is utilized, its construction provides accurate axial alignment, the capability of testing before installation, the capability of removal for inspection and repair if necessary, and readings that are not substantially affected by bending loads.

In the preferred construction of the strain gauge transducer, the web of the intermediate portion has a thickness in the range of about 0.020 to 0.060 of an inch and, most preferably, about 0.040 of an inch. It is undesirable for the web to have a thickness substantially smaller than the lower limit of this range in that it tends to twist upon installation as a torque is applied to the head to thread the inner end into the hole in which the transducer is mounted. Furthermore, it is undesirable for the web to have a thickness substantially thicker than the upper limit of this range in that this tends to increase the resistance of the web to deformation and thereby decreases the extent of deformation that can be sensed by the strain gauges upon loading and the resultant accuracy in reading loads. A web thickness of about 0.040 of an inch provides a good compromise in resisting twisting without retarding deformation of the web as it is loaded.

At each end of the web, the intermediate portion of the transducer body includes inner and outer portions of a greater cross-sectional size than the web, and preferably of a round shape. These round inner and outer portions are respectively located adjacent the inner and outer ends of the body with the web between the round portions. This construction of the transducer body can be machined by first turning the intermediate portion and then using a suitable cutting opreation to define the web with its parallel surfaces. Also, the round inner and outer portions smooth out any stress concentrations from the inner and outer ends to provide a uniform loading of the web.

The preferred construction of the strain gauge transducer includes a wire passage that comprises a groove in the head of the outer end of the transducer body. This head of the outer end also preferably includes a wrench socket opening that is utilized to thread the transducer into a threaded hole for use. Best results are achieved when the annular seat on the head of the transducer body is flat and faces axially toward the inner end in a perpendicular relationship to the central axis.

The objects, features, and advantages of the present invention are readily apparent from the following detailed description of the best mode for carrying out the invention when taken in connection with the accompanying drawings.

BRIEF DESCRIPTION OF DRAWINGS

FIG. 1 is a sectional view through the head end of a bolt in which a strain gauge transducer in accordance with present invention is mounted;

FIG. 2 is an enlarged view of the strain gauge transducer shown in FIG. 1;

FIG. 3 is a side view of the strain gauge transducer taken along the line 3—3 in FIG. 2;

FIGS. 4 and 5 are views respectively similar to FIGS. 2 and 3 but illustrating placement of strain gauges on the transducer;

FIG. 6 is a schematic view of a full bridge circuit with which the transducer is utilized to read loading with compensation for any bending loading or temperature changes;

FIG. 7 is a schematic view of a half bridge circuit with which the transducer is utilized to sense loading with compensation for temperature changes but no compensation for bending loading; and FIG. 8 is a schematic view of a quarter bridge circuit with which the transducer is utilized to sense loading with compensation for bending loading but no compensation for temperature changes.

BEST MODE FOR CARRYING OUT THE INVENTION

With reference to the drawings, a strain gauge transducer generally indicated by 10 is illustrated mounted in a bolt 12 to sense loading of the bolt by operation of the transducer as is hereinafter more fully described. It should be understood that the transducer 10 also can be utilized with members other than bolts but that the transducer has particular utility when utilized in the bolt environment illustrated.

With continuing reference to FIG. 1, the bolt 12 has a head 14 from which a shank 16 extends, and the bolt also has an unshown threaded end formed on the shank in a conventional manner. A counterbored hole 18 extends through the bolt head 14 and into the shank 16 and has a threaded inner portion 20 that is utilized to secure the transducer 10 upon assembly. A round intermediate portion 22 of the bolt hole 18 and a larger diameter outer portion 24 thereof are connected by an annular surface 26 that faces outwardly and extends perpendicular to the central axis of the bolt to provide for mounting of the transducer 10 in cooperation with the threaded inner portion 20. Also, a wire connector 28 is mounted by the outer portion 24 of the bolt hole 18 to sense and transmit load readings from the transducer 10 as the bolt is loaded.

With combined reference to FIGS. 1, 2, and 3, the strain gauge transducer 10 includes a transducer body 30 having a central axis A. Transducer body 30 includes a threaded inner end 32 that is received by the threaded portion 20 of the bolt hole upon assembly. An outer end of the transducer body includes an enlarged head 34 that is received within the outer portion 24 of the bolt hole in the assembled position. This enlarged head 34 includes an annular seat 36 that faces toward the inner end 32 so as to engage the annular bolt surface 26 upon assembly. The transducer body 30 also includes an intermediate portion 38 having a web 40 that connects its inner and outer ends thereof. This web 40 includes oppositely facing parallel surfaces 42 and has a width that is a plurality of times the thickness thereof and less than the diameter of the threaded inner end 32. Transducer 10 also includes at least two strain gauges as schematically indicated at 46, each of which is mounted on one of the web surfaces 42 to sense deformation of the web upon loading. A wire passage 48 is provided through one end of the transducer body, preferably through the head 34. Wires 50 are connected to the strain gauges 46 and extend through the wire passage 48 for connection to the connector 28 in order to permit sensing of the deformation sensed by the web upon loading.

Insertion of the strain gauge transducer 10 into the bolt hole 18 as shown in FIG. 1 is performed prior to securement of the wire connector 28 within the outer portion 24 of the bolt hole in any suitable manner such as by an interference fit. The mounting of the transducer 10 is performed by first inserting the inner end 32 into the bolt hole 18 for threading engagement with the inner threaded hole portion 20. Rotation of the transducer 10 eventually engages the head seat 36 with the annular bolt surface 26 such that the web 40 is tensioned and thus deformed by any loading of the bolt. Loading of the bolt deforms the web 40 and thereby deflects the strain gauges 46 such that a signal carried by the wires 50 can sense the loading and be read by suitable instrumentation.

In the preferred construction, the web of the intermediate portion 38 of the transducer body has a thickness t in the range of about 0.020 to 0.060 of an inch. Testing has shown that it is relatively important for the web to have a thickness in this range for the following reasons. First, a web thickness substantially thinner than the lower limit results in twisting of the web as the transducer is threaded into the bolt hole, and such twisting distorts the axial loading read by the transducer. Second, a web thickness substantially greater than the upper limit results in two problems. One problem with the thicker web is that the web becomes much more rigid and its deformation is substantially decreased with respect to the total deformation of the rest of the transducer body so that the signal generated is not as great and thus is more difficult to read. Another problem with the thicker web is that the strain gauges are then placed farther from the central axis A at which bending loading does not produce any deformation. Thus, the thicker web places the strain gauges farther from the neutral axis of bending and reads bending loads to a much greater extent than with thinner webs. The best compromise has been found to result with a web having a thickness of about 0.040 of an inch, since this web has sufficient resistance to twisting while still permitting the strain guages to be positioned close to the neutral axis of bending so that gauge misalignment does not result in readings that are substantially affected by bending loading.

As illustrated in FIGS. 1 through 3, the intermediate portion 30 of the transducer body includes inner and outer portions 52 and 54 of a greater crosssectional size than the web and preferably of a round shape. These round inner and outer portions 52 and 54 are respectively located adjacent the inner and outer ends of the body. Web 40 extends between the inner and outer round portions 52 and 54 to provide the connection between the threaded inner end 20 and head 34 of the outer end. Such a transducer body construction can be readily machined by a turning operation that initially forms a intermediate portion 30 with a round shape along its entire length and by a subsequent machining operation that removes material to define the flat web surfaces 42.

As illustrated in FIGS. 2 and 3, the wire passage 48 comprises a groove 56 that is formed in the enlarged head 34 at the outer end of the transducer body. This groove 56 also extends through the outer round portion 54 of the intermediate transducer body portion 30 so as to permit the wires 50 to extend from the strain gauges 46 outwardly past the head 34 without any sharp ends. At the outer side of head 34, a wrench socket opening 58 is provided to receive a suitable wrench that is utilized to thread the transducer body 30 to the assembled position shown in FIG. 1.

As illustrated in FIGS. 1 through 3, the annular seat 36 on the head 34 of the transducer body is flat and faces axially toward the inner end 32 in a perpendicular relationship to the central axis A. When utilized with a bolt 12 like the one shown in FIG. 1 with a hole having the flat annular surface 26, the flat seat 36 provides a surface-to-surface contact that tensions the web 40 and permits accurate readings of axial loads applied to the bolt. Also in this regard, it has been determined that best results are achieved when the annular seat 36 is provided with a surface finish on the order of about 25 RMS.

Any conventional type of attachment method can be utlized to secure the strain gauges 46 to the oppositely facing surfaces 42 of the web such as, for example, the use of an adhesive such as epoxy. In adhesively securing the strain gauges 46, it has been determined that good results in readings are obtained when the web surfaces 42 have a surface finish on the order of about 25 RMS.

With reference to FIGS. 4 and 5, the transducer 10 is illustrated as including strain gauges 46 of both the tension and compression type with appropriate reference designations so as to explain the operation of the bridge circuits illustrated in FIGS. 6 through 8. As seen in FIGS. 4 and 5, tension strain gauges T1 and T2 are provided to sense deformation along the axial length of the transducer, and compression strain gauges C1 and C2 are provided to sense deformation transverse to the axial length of the transducer. However, as will be hereinafter apparent in connection with the description of the bridge circuits, it is not absolutely necessary to include two strain gauges of each type depending upon whether the transducer needs to be compensated for bending and temperature.

With reference to FIG. 6, the bridge circuit 60 illustrated includes tension strain gauges T1 and T2 located on one set of opposite legs of the bridge and also includes compression strain gauges C1 and C2 located on the other set of opposite legs of the bridge. A voltage Vin applied to the bridge provides an output signal Vout that is compensated for both bending and temperature.

With reference to FIG. 7, a half bridge circuit 64 illustrated includes a single tension strain gauge T1 on one leg of the bridge and also includes a single compression strain gauge C1 on an adjacent leg of the bridge. In addition, bridge 64 includes resistors R1 and R2 respectively located on legs opposite the gauges C1 and T1. This bridge provides temperature compensation but does not provide any electrical compensation for bending loads at the output signal Vout when an input voltage Vin is applied.

The quarter bridge circuit 66 illustrated in FIG. 8 includes two tension strain gauges T1 and T2 located on the same leg of the bridge and also includes resistors R1, R2, and R3 respectively located on the other three legs of the bridge. This bridge is compensated for bending at the output signal Vout but is not electrically compensated for temperature changes when an input voltage is provided across the input Vin.

It should be understood that other types of bridges can also be utilized with the transducer 10 in addition to the specific ones illustrated. For example, the tension and compression strain gauges of the bridge 64 illustrated in FIG. 7 do not necessarily have to be on the same surface of the web as shown but, rather, could be on opposite surfaces. Likewise, other circuits for sensing the loading can be utilized.

Regardless of the type of circuitry with which the transducer 10 is utilized, its construction provides distinct advantages. Accurate axial alignment of the strain gauges with the bolt is achieved by the construction of the transducer with its web 40 extending axially along the central bolt axis. Testing of the transducer before installation into the bolt is also possible as is subsequent removal for inspection and repair if necessary. The flat surfaces 42 of the transducer web 40 give linear readings and are located close to the central axis so that no significant bending strains are present. Also, even with the circuits that are designed for bending compensation, some error can be introduced by bending loading which accounts for the desirability in having a web that is not too thick as discussed above in connection with the preferred construction of the web. Furthermore, the flat construction of the head seat 36 and its surface finish result in accurate readings reflecting the loading of the bolt.

While the best mode for carrying out the invention has been described in detail, those familar with the art to which this invention relates will recognize various alternative designs and embodiments for carrying out the invention as defined by the following claims.

What is claimed is:

1. A strain gauge transducer assembly comprising: a bolt having a central axis and including a head having a counterbored hole extending therethrough along the central axis of the bolt; said counterbored hole including a threaded inner portion, an intermediate portion extending outwardly from the threaded inner portion, an outer portion of a larger size than the intermediate portion, and an outwardly facing surface that extends between the intermediate and outer portions in a perpendicular relationship to the central axis; a transducer received within the counterbored hole of the bolt; said transducer including a body having a central axis coaxial with the central axis of the bolt and including a threaded inner end threaded into the inner portion of the counterbored hole; said transducer body also including an outer end having an enlarged head; said enlarged head having an annular seat that faces toward the inner end thereof extending perpendicular to the central axis thereof in engagement with the outwardly facing surface of the counterbored hole in the bolt; the transducer body also including an intermediate portion having a web that connects the inner and outer ends thereof and has oppositely facing parallel surfaces; said web having a thickness in the range of about 0.020 to 0.060 of an inch and also having a width that is a plurality of times the thickness thereof and less than the diameter of the threaded inner end; at least two strain gauges each of which is mounted on one of the surfaces of the web to sense deformation of the web; a wire passage through one end of the transducer body; and wires connected to the strain gauges and extending through the wire passage to permit sensing of the web deformation and stress of the bolt.

2. A transducer assembly as in claim 1 wherein the web of the intermediate portion has a thickness of about 0.040 of an inch.

3. A transducer assembly as in claim 1 or 2 wherein the intermediate portion of the transducer body includes inner and outer portions of a larger size than the web and respectively located adjacent the inner and outer ends of the body with the web therebetween.

4. A transducer assembly as in claim 3 wherein the inner and outer portions of the intermediate portion of the transducer body are round.

5. A transducer assembly as in claim 1 or 2 wherein the wire passage comprises a groove in the head of the outer end of the transducer body.

6. A transducer assembly as in claim 1 or 2 wherein the head of the outer end includes a wrench socket opening.

7. A transducer assembly as in claim 1 or 2 wherein the annular seat on the head of the transducer body has a surface finish of about 25 RMS.

8. A strain gauge transducer assembly comprising: a bolt having a central axis and including a head having a counterbored hole extending therethrough along the central axis of the bolt; said counterbored hole including a threaded inner portion, an intermediate portion extending outwardly from the threaded inner portion, an outer portion of a larger size than the intermediate portion, and an outwardly facing surface that extends between the intermediate and outer portions in a perpendicular relationship to the central axis; a transducer received within the counterbored hole of the bolt; said transducer including a body having a central axis coaxial with the central axis of the bolt and including a threaded inner end threaded into the inner portion of the counterbored hole; said transducer body also including an outer end having an enlarged head; an annular seat on the head facing axially toward the inner end extending in a perpendicular relationship to the central axis thereof in engagement with the outwardly facing surface of the counterbored hole in the bolt; a wire passage extending axially through the head; the transducer body also including an intermediate portion having a web that connects the inner and outer ends thereof and has oppositely facing parallel surfaces; said web having a thickness in the range of about 0.020 to 0.060 of an inch and also having a width that is a plurality of times the thickness thereof and less than the diameter of the threaded inner end; at least two strain gauges each of which is mounted on one of the web surfaces to sense deformation of the web; and wires connected to the strain gauges and extending through the wire passage of the head to permit sensing of the web deformation and stress of the bolt.

9. A strain gauge transducer assembly comprising: a bolt having a central axis and including a head having a counterbored hole extending therethrough along the central axis of the bolt; said counterbored hole including a threaded inner portion, an intermediate portion extending outwardly from the threaded inner portion, an outer portion of a larger size than the intermediate portion, and an outwardly facing surface that extends between the intermediate and outer portions in a perpendicular relationship to the central axis; a transducer received within the counterbored hole of the bolt; said transducer including a body having a central axis coaxial with the central axis of the bolt and including a threaded inner end threaded into the inner portion of the counterbored hole; said transducer body also including an outer end having an enlarged head; said enlarged head having an annular seat that faces toward the inner end thereof extending perpendicular to the central axis thereof in engagement with the outwardly facing surface of the counterbored hole in the bolt; the transducer body also including an intermediate portion having a web that connects the inner and outer ends thereof and has oppositely facing parallel surfaces; said web having a width less than the diameter of the threaded inner end and a thickness in the range of about 0.020 to 0.060 of an inch; at least two strain gauges each of which is mounted on one of the web surfaces to sense deformation of the web; a wire passage through one end of the transducer body; and wires connected to the strain gauges and extending through the wire passage to permit sensing of the web deformation and stress of the bolt.

10. A strain gauge transducer assembly comprising: a bolt having a central axis and including a head having a counterbored hole extending therethrough along the central axis of the bolt; said counterbored hole including a threaded inner portion, an intermediate portion extending outwardly from the threaded inner portion, an outer portion of a larger size than the intermediate portion, and an outwardly facing surface that extends between the intermediate and outer portions in a perpendicular relationship to the central axis; a transducer received within the counterbored hole of the bolt; said transducer including a body having a central axis coaxial with the central axis of the bolt and including a threaded inner end threaded into the inner portion of the counterbored hole; said transducer body also including an outer end having an enlarged head; said enlarged head having an annular seat of a flat shape facing axially toward the inner end and extending in a perpendicular relationship to the central axis thereof in engagement with the outwardly facing surface of the counterbored hole in the bolt; a wire passage extending axially through the head of the transducer body; the transducer body also including an intermediate portion having a web that connects the inner and outer ends thereof and has oppositely facing parallel surfaces; said web having a width less than the diameter of the threaded inner end and a thickness in the range of about 0.020 to 0.060 of an inch; at least two strain gauges each of which is mounted on one of the web surfaces to sense deformation of the web and stress of the bolt; and wires connected to the strain gauges and extending through the wire passage to permit sensing of the deformation.

11. A strain gauge transducer assembly comprising: a bolt having a central axis and including a head having a counterbored hole extending therethrough along the central axis of the bolt; said counterbored hole including a threaded inner portion, an intermediate portion extending outwardly from the threaded inner portion, an outer portion of a larger size than the intermediate portion, and an outwardly facing surface that extends between the intermediate and outer portions in a perpendicular relationship to the central axis; a transducer received within the counterbored hole of the bolt; said transducer including a body having a central axis coaxial with the central axis of the bolt and including a threaded inner end threaded into the inner portion of the counterbored hole; said transducer body also including an outer end having an enlarged head; said enlarged head having a wrench socket opening and also having an annular seat that faces toward the inner end thereof extending perpendicular to the central axis thereof in engagement with the outwardly facing surface of the counterbored hole in the bolt; an axial groove defining a wire passage through the head of the transducer body; the transducer body including an intermediate portion having inner and outer round portions respectively connected to the inner and outer ends and also having a web that extends between the inner and outer round portions and has oppositely facing parallel surfaces; said web having a width less than the diameter of the threaded inner end and a thickness in the range of about 0.020 to 0.060 of an inch; at least two strain gauges each of which is mountd on one of the web surfaces to sense deformation of the web; and wires connected to the strain gauges and extending through the wire passage to permit sensing of the web deformation and stress of the bolt.

* * * * *